United States Patent [19]

Michalski et al.

[11] Patent Number: 4,639,359

[45] Date of Patent: Jan. 27, 1987

[54] PROCESS OF REMOVING CATIONIC IMPURITIES FROM WET PROCESS PHOSPHORIC ACID

[75] Inventors: Dennis H. Michalski, Lakeland, Fla.; Viswanathan Srinivasan, Terre Haute, Ind.

[73] Assignee: International Minerals & Chemical Corp., Terre Haute, Ind.

[21] Appl. No.: 809,440

[22] Filed: Dec. 16, 1985

[51] Int. Cl.$^4$ ............................................. C01B 25/16
[52] U.S. Cl. ................................. 423/321 R; 423/158; 423/317; 423/465
[58] Field of Search ................. 423/321 R, 320, 317, 423/321 S, 158, 465, 472

[56] References Cited

U.S. PATENT DOCUMENTS

| | | | |
|---|---|---|---|
| 3,642,439 | 2/1972 | Moore et al. | 423/321 R |
| 4,136,199 | 1/1979 | Mills | 423/321 R |
| 4,288,804 | 11/1981 | Parks et al. | 423/321 R |
| 4,435,372 | 3/1984 | Frazier et al. | 423/321 R |
| 4,493,820 | 1/1985 | Clausen | 423/310 |
| 4,500,502 | 2/1985 | McDonald et al. | 423/32 R |
| 4,554,144 | 11/1985 | Ore | 423/321 R |

OTHER PUBLICATIONS

*Fertilizer Manual,* International Fertilizer Development Center, United Nations Industrial Development Organization, Dec. 1979, pp. 191–193.

*Primary Examiner*—Gregory A. Heller
*Attorney, Agent, or Firm*—Wendell R. Guffey; Thomas L. Farquer

[57] ABSTRACT

A method of removing aluminum, magnesium, iron and other impurities from wet process phosphoric acid is provided. The method comprises partially ammoniating the acid and reacting the acid with a fluoride ion donating compound to precipitate aluminum- and magnesium-containing ralstonite and ammonium fluorosilicate which can be easily separated from the acid thereby producing a partially ammoniated wet process phosphoric acid of reduced impurities content.

20 Claims, No Drawings

4,639,359

PROCESS OF REMOVING CATIONIC IMPURITIES FROM WET PROCESS PHOSPHORIC ACID

BACKGROUND OF THE INVENTION

1. Field of the Invention

The present invention relates to a method of removing impurities from wet process phosphoric acid. More particularly, the present invention relates to a process of precipitating aluminum, magnesium, iron and other cationic impurities from wet process phosphoric acid.

2. Description of the Prior Art

Wet process phosphoric acid is made by reacting phosphate rock with sulfuric acid. Phosphate rock is principally composed of fluoroapatite, but large amounts of contaminating substances are always present. These include silica and metal values such as iron, aluminum and magnesium along with smaller amounts of trace impurities. During the reaction with sulfuric acid, gypsum is precipitated and removed by filtration. After filtration of gypsum, many solubilized impurities remain in the acid. Because the quality of phosphate rock is declining as the better grades of the mineral are mined, the impurity levels in the wet process acid obtained from mined phosphate rock have been steadily increasing.

The presence of impurities in wet process phosphoric acid results in a variety of problems for those who manufacture ammonium phosphate fertilizers. One problem is that the presence of impurities dilutes the nitrogen and $P_2O_5$ contents of the fertilizer ingredients thus resulting in a lower grade. Impurities also precipitate from the phosphoric acid and settle during storage thereby resulting in slime accumulation in storage tanks and other apparatus resulting in reprocessing and equipment cleaning costs, effective reduction in storage capacity, production loss, the clogging of liquid fertilizer application equipment, particularly spray nozzle orifices through which the fertilizer is applied, and precipitates which tie up phosphate in a form that is unavailable to plants (i.e., citrate insoluble form).

Because of the desirability of removing impurities from wet process acid, a number of different impurity removal methods have been developed. One such method is solvent extraction, of which there are a number of variations. Solvent extraction involves the extraction of either phosphoric acid or impurities from wet process phosphoric acid using an organic extractant, while leaving other components behind in the aqueous solution. Significant disadvantages of solvent extraction are the high capital and operating costs and the fact that organic solvents must be handled.

Another type of impurity removal process is concentration/clarification of wet process phosphoric acid. In the first step of this process, wet process acid is concentrated to about 54% $P_2O_5$ and some of the impurities are allowed to precipitate. However, there are several major disadvantages to the process, namely, high energy consumption, difficulties in concentrating the acid from low quality phosphate rock, the cost of clarification equipment and the inability to reduce impurity concentrations to acceptably low levels.

Another general method of removing metal impurities from wet process acid involves ammoniation of wet process acid. Metal impurities normally found in phosphate rock include minerals containing magnesium, aluminum, iron and others.

U.S. Pat. No. 4,136,199 discloses a method for removing metal ion impurities from wet process phosphoric acid by treating waste pond water from a wet process phosphoric acid plant with lime or limestone to obtain a sludge high in calcium fluoride which, when added to wet process acid, causes the precipitation of solids containing fluorine and metal ions such as magnesium and aluminum.

U.S. Pat. No. 4,500,502 discloses a method of preparing a purified ammoniated phosphoric acid composition by reacting wet process phosphoric acid containing magnesium, aluminum and fluorine impurities with ammonium ions, including ammonia, in order to precipitate complex metal salts containing magnesium, aluminum and fluorine. Unfortunately the complex metal salts also contain valuable phosphates which are lost.

U.S. Pat. No. 4,299,804 discloses a method of removing magnesium and aluminum impurities from wet process phosphoric acid. The disclosed process maintains the Al/Mg mole ratio within the range of 1.1–2.0 and the F/Al ratio within the range of 3.5–7 by adding aluminum ion donating compounds (such as alum) and fluoride ion donating compounds (such as hydrofluoric acid) which are reacted with wet process acid to precipitate crystalline compounds containing magnesium, aluminum and fluorine ($MgAl_2F_8$).

U.S. Pat. No. 4,493,820 discloses a typical concentration/clarification process.

U.S. Pat. No. 4,435,372 discloses the removal of aluminum, magnesium and fluoride ion impurities from wet process phosphoric acid by hydrolizing and recycling the off-gas scrubber solutions in the presence of a ferric iron catalyst.

U.S. Pat. No. 4,325,327 discloses a two-stage ammoniation process involving the precipitation of solids in the pH regions of 1.5–2.5 and 4–5. The solids are filterable and thus easily separated from the monoammonium phosphate solutions.

SUMMARY OF THE INVENTION

Accordingly, it is an important object of the present invention to provide a process by which impurities, especially metal cationic impurities such as aluminum, magnesium and iron, present in wet process phosphoric acid can be substantially removed by precipitation while at the same time maintaining a high $P_2O_5$ concentration.

It is another important object of the present invention to provide an ammoniated liquid phosphate fertilizer that can be stored for extended periods of time without encountering solid precipitation problems.

These and other important objects of the present invention are attained by a method of removing aluminum, magnesium, iron and other impurities from wet process phosphoric acid comprising partially ammoniating wet process phosphoric acid having a $P_2O_5$ concentration within the range of about 17–54%, reacting the acid with a fluoride ion donating compound to precipitate compounds containing said impurities, thereby producing a partially ammoniated phosphoric acid of reduced impurities content. The impurity-containing compounds precipitated in connection with the present invention include: (i) aluminum- and magnesium-containing ralstonite; and (ii) ammonium fluorosilicate or magnesium fluorosilicate; which precipitated compounds can be easily separated from the acid. The purified acid comprises an excellent feed for producing monoammonium or diammonium phosphate.

While specific preferred embodiments of the invention have been selected for description hereinbelow, it will be appreciated by those skilled in the art that a wide variety of modifications and variations of the invention can be made without departing from the scope of the invention, as defined in the appended claims.

DETAILED DESCRIPTION

The method of the present invention is effective for removing aluminum, magnesium, iron and other impurities from wet process phosphoric acid, having a $P_2O_5$ concentration of from about 17 to 54% by causing precipitates of ralstonite and fluorosilicates to form. Normally, the phosphoric acid will have a $P_2O_5$ concentration of from about 17% to 45%. Briefly, the method comprises the combined treatment of (i) partially ammoniating the wet process acid and (ii) adding a fluoride ion donating compound.

The method of the present invention is particularly useful in connection with processes in which wet process phosphoric acid is ammoniated and granulated to produce monoammonium or diammonium phosphate. Typically when making an ammoniated phosphate fertilizer, a mixture of wet process phosphoric acid, having a $P_2O_5$ content of about 40-55%, and a scrubber liquor (also a wet process phosphoric acid stream) is reacted in a preneutralizer with ammonia to form a slurry having an N/P mole ratio between about 1.35 to 1.55. The slurry then is further ammoniated in a drum granulator to produce granular diammonium phosphate. Scrubber liquor is produced when dilute wet phosphoric acid (about 18%-30% $P_2O_5$) is used to scrub ammonia vapors emanating from the granulator and the preneutralizer. The N/P mole ratio of the scrubber liquor often ranges from about 0.3 to about 1.6, typically about 0.4.

According to one embodiment of the present invention, a soluble fluoride ion donating compound capable of releasing free fluoride ions, such as ammonium fluoride, is added to the scrubber liquor. The scrubber liquor constitutes a partially ammoniated wet process phosphoric acid stream. Ammonium fluoride should be added in an amount of up to about 3.0 wt. %, preferably about 1.5 wt. %, based on the total weight of the scrubber liquor. If other fluoride ion donating compounds are used, the fluoride should be added in an amount up to about 1.5 wt. % as F. If necessary, additional ammonia can be added to the scrubber liquid to increase its N/P ratio to at least about 0.2.

Seed crystals of ralstonite, which assist in the precipitation of ralstonite, also may be added at this time.

The mixture is then sent to a settling tank where the mixture is allowed to sit preferably for up to about 8 hours. This allows the ralstonite crystals, as well as the fluorosilicate crystals to form and settle to the bottom of the tank. The mixture can then be sent to any number of known separation apparatus including filtering devices, centrifuges, decanters and the like in order to separate the precipitated ralstonite and fluorosilicates from the purified acid. The purified acid then can be used for manufacturing diammonium phosphate or monoammonium phosphate.

As examples of fluoride ion donating compounds there can be mentioned any compound which freely donates fluoride ions when in solution. For example, $NH_4F$, HF, NaF, and $NaHF_2$, $NH_4HF_2$, and KF may all be used as fluoride ion donating compounds. Of these, ammonium fluoride and hydrofluoric acid are preferred since these compounds add no undesirable metal ion impurities (such as sodium and potassium) to the wet process acid. Compounds such as fluosilicic acid and fluorosilicate salts cannot be used in the present invention since these compounds do not freely dissociate when in solution.

The wet process acid may be ammoniated in any number of ways, including sparging with ammonia gas or by the addition of hydrous ammonia to the wet process acid. The amount of ammonia added to the acid is preferably calculated to give a N/P mole ratio in the range of about 0.2-1.0. In the case when the fluoride ion donating compound contains nitrogen (such as ammonium fluoride) the N/P mole ratio should be within this range after both partial ammoniation and the addition of the fluoride ion donating compound. Preferably, the N/P mole ratio is within the range of about 0.2-0.3.

When using ammonium fluoride, the amount added to the wet process acid may be in concentrations up to about 3.0 wt. %, preferably about 1.5 wt. %, based upon the total weight of the acid. If other fluoride donating compounds are used, the total added fluoride should be in an amount of up to about 1.5% wt. % as fluoride. The amount of fluoride ion donating compound added to the wet process acid should be determined based upon the concentrations of magnesium and aluminum impurities in the acid. Thus, in cases where the acid contains very low magnesium and aluminum impurities, only small amounts of the fluoride ion donating compound need be added.

The end product of the ammoniation of wet process phosphoric acid is typically an ammonium phosphate fertilizer. Fertilizers are typically graded depending upon their nitrogen, phosphorus and potassium contents. The ammoniation of phosphoric acid produces a N,P grade fertilizer. Thus, the use of ammonium fluoride as the fluoride ion donating compound is preferable from the standpoint that it contributes to the overall nitrogen content of the fertilizer product.

In the processes of the present invention, three separate species of compounds may be precipitated. The first is ralstonite which is a class of compounds in the cryolite family having the general formula:

$$(NH_4)AlMgF_{y-z}(OH)_z \cdot xH_2O$$

wherein y typically equals 6, z typically equals 1, and x typically equals 0–1.

The second class of compounds precipitated by the processes of the present invention comprise fluorosilicates of the general formula:

$$(M)_q SiF_6$$

wherein M is a cation such as ammonium, magnesium, calcium, etc. and q is 1 or 2.

A third class of precipitates comprises aluminum and iron-containing compounds having the general formula $$(Fe,Al)_3(K,NH_4)H_8(PO_4)_6 \cdot 6H_2O$$

While this third class of precipitates is desirable from the standpoint of removing iron impurities from the acid, it is undesirable from the standpoint that some phosphate values are lost. Unfortunately, the art has yet to devise any means of precipitating iron without also precipitating some phosphate values. However, the processes of the present invention precipitate much less phosphate values than the prior art processes which tended to lose phosphate values in the removal of magnesium and aluminium impurities, as well as in the removal of iron impurities.

The advantages of the present invention will become more apparent from the examples appearing hereinafter.

EXAMPLES 1-4

In Examples 1-4, 450 g of 27% acid was placed in a teflon coated stainless steel beaker with a teflon stir bar. A loose-fitting plexiglas cap having holes for a teflon coated thermometer was placed on the beaker. The beaker was also fitted with a gas sparger (the sparger was made from teflon tubing with 16-20 1.5" long razor blade slashes near one end and was plugged with solid teflon). The contents of the beaker were heated to 75° C. while stirring vigorously on a Corning PC-351 hot plate stirrer, after which time the quantity of $NH_4F$ indicated in Table 1 was quickly added to each sample. The beaker was heated to 85° C. and ammonia was sparged over a 22 minute period. Subsequently, the slurry was aged with slow stirring at 75° C., removed from the heat and its viscosity measured at 75° C. with a Thomas viscosimeter. The slurry was centrifuged at 600+ g for 40 minutes. The supernatant was collected and weighed and the solids were washed with acetone, centrifuged twice, and then washed again with acetone, filtered and dried. The chemical analyses for the four examples are presented in Table 1.

TABLE 1

| | | | | Supernatant Liquid Chemical Analyses | | | | | | |
|---|---|---|---|---|---|---|---|---|---|---|
| Example No. | N/P Mole Ratio | Wt % $NH_4F$ Added | Aging Time (min.) | % $NH_4$ | % Al | % Fe | % Mg | % F | % $P_2O_5$ | % $P_2O_5$ (% Al + % Fe + % Mg) |
| Untreated Acid | — | — | — | 0.069 | 0.495 | 0.89 | 0.275 | 2.15 | 26.7 | 16.08 |
| 1 | 0.3 | 3.0 | 60 | 3.22 | 0.17 | 0.80 | 0.0842 | 2.1 | 26.8 | 25.42 |
| 2 | 0.3 | 1.5 | 60 | 3.28 | 0.17 | 0.82 | 0.0804 | 2.1 | 26.8 | 25.04 |
| 3 | 0.3 | 1.5 | 240 | 3.23 | 0.080 | 0.12 | 0.0376 | 2.1 | 26.5 | 111.53 |
| 4 | 0.5 | 1.5 | 240 | 4.63 | 0.099 | 0.0433 | 0.0461 | 2.0 | 26.2 | 139.09 |

The $SO_4$ content was 1.6% for the untreated acid, was 1.7% for Examples 1 and 2 and was 1.8% in Examples 3 and 4. The acid of Example 2 was seeded with 0.6677 g of the solids recovered from Example 1 prior to the addition of ammonium fluoride. Ammoniation and fluoride additive levels for Example 3 were similar to those of Example 2, but the aging time was increased to four hours and 1.02 g of solids recovered in Example 1 solids were used for seeding. Example 4 was similar to Example 3 but the N/P mole ratio achieved by ammoniation was increased from 0.3 to 0.5.

X-ray diffraction analysis for the solids collected from Example 1 revealed significant amounts of ralstonite, $Fe_3(K,NH_4)H_8(PO_4)_6 \cdot 6H_2O$, ammonium fluorosilicate and potassium fluorosilicate.

Increasing the aging time from one hour to four hours decreases the final magnesium and aluminum content of the liquid phase acid by over 50% and the final iron content by 85%. Increasing the N/P mole ratio to 0.5 at a four hour aging time increased the magnesium and aluminum contents slightly, while reducing the iron content by an additional two-thirds.

We claim:

1. A method for removing aluminum, magnesium and iron impurities from wet process phosphoric acid having a $P_2O_5$ content of about 17-54%, comprising the steps of:
    partially ammoniating the phosphoric acid;
    adding a fluoride ion donating compound to the acid to form a precipitate;
    separating the precipitate from the acid; and
    recovering a partially ammoniated wet process phosphoric acid of reduced impurity content.

2. The method of claim 1 wherein the phosphoric acid has a $P_2O_5$ concentration of about 17 to 45% and a precipitate containing a fluorosilicate, an aluminum-, magnesium- and fluorine-containing ralstonite and an iron-, potassium- and ammonium-phosphate is formed.

3. The method as defined in claim 1, wherein the fluoride ion donating compound comprises HF.

4. The method as defined in claim 1, wherein the fluoride ion donating compound is selected from the group consisting of ammonium fluoride and ammonium bifluoride and both.

5. The method as defined in claim 2, wherein the ralstonite comprises $NH_4MgAlF_6 \cdot H_2O$.

6. The method as defined in claim 2, wherein the precipitated fluorosilicate comprises ammonium fluorosilicate.

7. The method as defined in claim 3, wherein the precipitated fluorosilicate comprises magnesium fluorosilicate.

8. The method as defined in claim 1, wherein the fluoride ion donating compound is selected from the group consisting of sodium fluoride, sodium bifluoride and mixtures thereof.

9. The method as defined in claim 1, wherein the fluoride ion donating compound is selected from the group consisting of potassium fluoride, potassium bifluoride and mixture thereof.

10. The method as defined in claim 1, wherein the ammoniated phosphoric acid has an N/P mole ratio in the range of 0.2-1.0.

11. The method as defined in claim 10, wherein the ammoniated phosphoric acid preferably has an N/P mole ratio within the range of 0.2-0.3.

12. The method as defined in claim 1, wherein the fluoride ion added is in an amount of up to about 3.0 wt. % based upon the total weight of the acid.

13. The method as defined in claim 12, wherein the amount of fluoride ion added is up to about 1.5 wt. %.

14. The method as defined in claim 2, wherein the iron phosphate precipitate comprises a compound having the formula of $Fe_3(K,NH_4)H_8(PO_4)_6 \cdot 6H_2O$.

15. The method as defined in claim 1, including the additional step of allowing the ammoniated phosphoric acid containing the added fluoride ion donating compound to settle.

16. The method as defined in claim 15, wherein the settling is conducted for up to about 8 hours.

17. The method as defined in claim 1, wherein the ammoniating step comprises sparging ammonia gas through the wet process phosphoric acid.

18. The method as defined in claim 1, wherein the ammoniating step comprises adding hydrous ammonia to the wet process phosphoric acid.

19. A method for removing aluminum, magnesium, and iron impurities from wet process phosphoric acid having a $P_2O_5$ content of about 17–54%, comprising the steps of:
   partially ammoniating said phosphoric acid thereby producing a phosphoric acid with a N/P ratio in the range from 0.2–1.0;
   adding a fluoride ion donating compound selected from the group consisting of HF, ammonium fluoride, ammonium bifluoride, a mixture of ammonium fluoride and ammonium bifluoride, sodium fluoride, sodium bifluoride, a mixture of sodium fluoride and sodium bifluoride, potassium fluoride, potassium bifluoride, and a mixture of potassium fluoride and potassium bifluoride to said ammoniated acid to form a precipitate;
   separating said precipitate from said ammoniated acid; and
   recovering a partially ammoniated wet process phosphoric acid of reduced impurity content.

20. A method for removing aluminum, magnesium, and iron impurities from wet process phosphoric acid having a $P_2O_5$ content of about 17–54%, comprising the steps of:
   partially ammoniating said phosphoric acid using a method selected from group consisting of sparging ammonia gas through and adding anhydrous ammonia to said phosphoric acid thereby producing a phosphoric acid with a N/P ratio in the range from 0.2–1.0;
   adding a fluoride ion donating compound selected from the group consisting of HF, ammonium fluoride, ammonium bifluoride, a mixture of ammonium fluoride and ammonium bifluoride, sodium fluoride, sodium bifluoride, a mixture of sodium fluoride and sodium bifluoride, potassium fluoride, potassium bifluoride, and a mixture of potassium fluoride and potassium bifluoride to said ammoniated acid in an amount up to about 3.0 wt. % based upon total weight to form a precipitate;
   separating said precipitate from said ammoniated acid; and
   recovering a partially ammoniated wet process phosphoric acid of reduced impurity content.

* * * * *